United States Patent
Fartmann et al.

(10) Patent No.: US 8,223,762 B2
(45) Date of Patent: Jul. 17, 2012

(54) METHOD AND DEVICE FOR TRANSLATING INTERNET PROTOCOL ADDRESSES INSIDE A COMMUNICATIONS NETWORK

(75) Inventors: Alfons Fartmann, Garching (DE); Martina Kauffmann, Karlsruhe (DE); Karl Klaghofer, München (DE); Gerald Liebe, Strausberg (DE); Heribert Müller, Eggenburg (AT); Michael Tietsch, Kaufering (DE); Jürgen Totzke, Poing (DE); Oliver Veits, Dachau (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 477 days.

(21) Appl. No.: 11/919,767

(22) PCT Filed: Apr. 12, 2006

(86) PCT No.: PCT/EP2006/061542
§ 371 (c)(1),
(2), (4) Date: Nov. 1, 2007

(87) PCT Pub. No.: WO2006/117284
PCT Pub. Date: Nov. 9, 2006

(65) Prior Publication Data
US 2009/0092132 A1 Apr. 9, 2009

(30) Foreign Application Priority Data

May 4, 2005 (DE) .......................... 10 2005 020 924

(51) Int. Cl.
*H04L 12/28* (2006.01)
(52) U.S. Cl. ...................... 370/389; 370/392; 370/401
(58) Field of Classification Search .................... None
See application file for complete search history.

(56) References Cited

U.S. PATENT DOCUMENTS

| | | | |
|---|---|---|---|
| 7,006,436 B1 * | 2/2006 | Chu et al. ...................... | 370/230 |
| 7,302,496 B1 * | 11/2007 | Metzger ......................... | 709/245 |
| 7,385,975 B2 * | 6/2008 | Liu ................................ | 370/389 |
| 2002/0101859 A1 * | 8/2002 | Maclean ........................ | 370/352 |
| 2002/0138622 A1 | 9/2002 | Dorenbosch et al. | |
| 2002/0159447 A1 * | 10/2002 | Carey et al. ................... | 370/389 |
| 2003/0161295 A1 * | 8/2003 | Shah et al. .................... | 370/352 |

FOREIGN PATENT DOCUMENTS

| | | |
|---|---|---|
| EP | 1 318 649 A1 | 6/2003 |
| EP | 1515515 | 3/2005 |

* cited by examiner

*Primary Examiner* — Bob Phunkulh
*Assistant Examiner* — Jenkey Van
(74) *Attorney, Agent, or Firm* — Buchanan Ingersoll & Rooney PC

(57) ABSTRACT

A private IP address is converted into a public IP address in a communications network without adapting a client software. The conversion of the private IP addresses into the public IP addresses is carried out via a network address translation. The private IP address of each terminal included in a payload of the IP data packet is convertible into a corresponding public IP address and, if necessary, vice-versa.

3 Claims, 1 Drawing Sheet

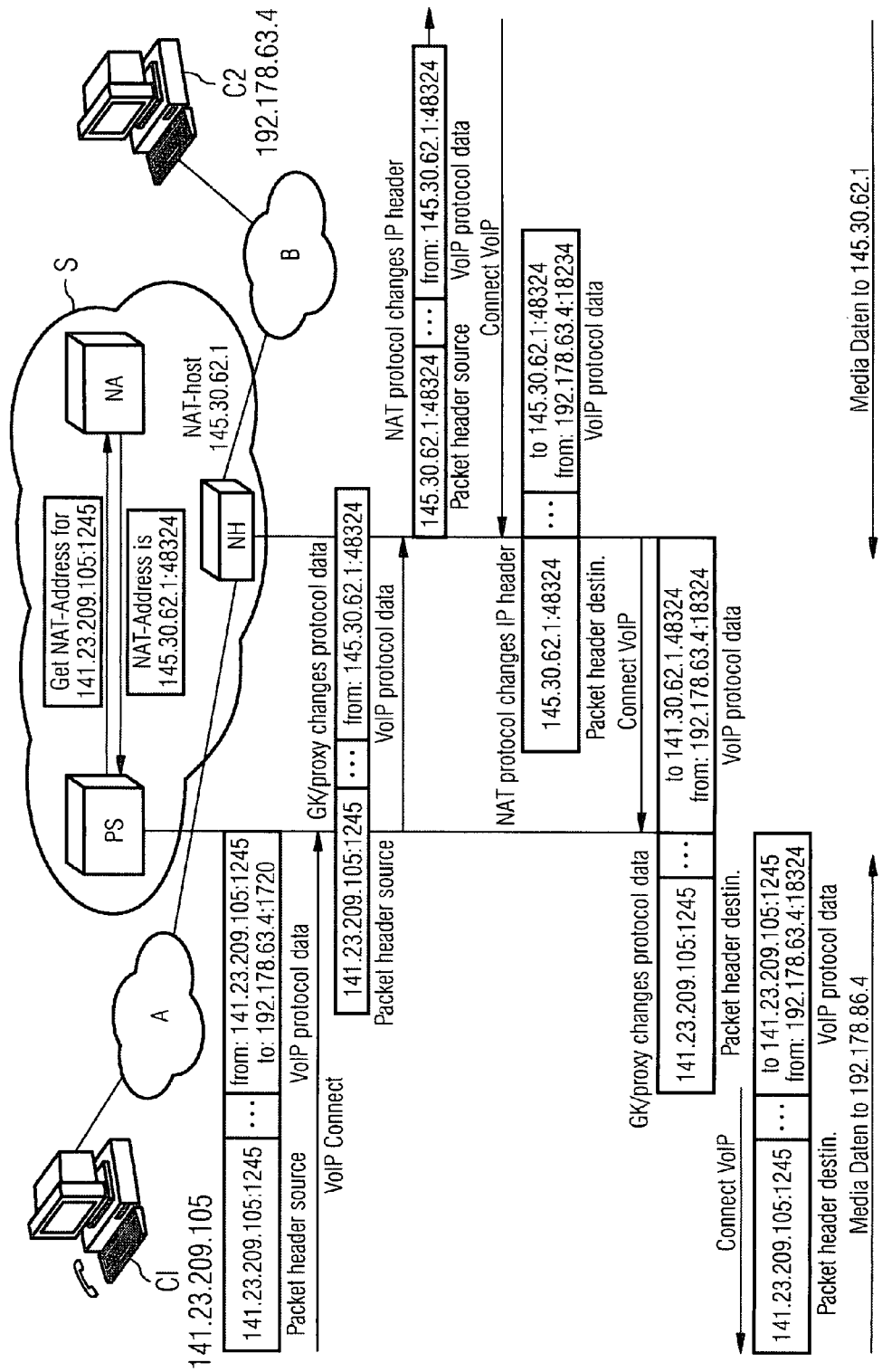

METHOD AND DEVICE FOR TRANSLATING INTERNET PROTOCOL ADDRESSES INSIDE A COMMUNICATIONS NETWORK

CROSS REFERENCE TO RELATED APPLICATIONS

This application is the US National Stage of International Application No. PCT/EP2006/061542, filed Apr. 12, 2006 and claims the benefit thereof. The International Application claims the benefits of German application No. 102005020924.6 DE filed May 4, 2005, both of the applications are incorporated by reference herein in their entirety.

FIELD OF INVENTION

The invention relates to a method and to a device for translating internet protocol addresses inside a communication network.

BACKGROUND OF INVENTION

Methods of the type in question are nowadays used on a large scale for transmitting voice, audio, video and/or payload data beyond network boundaries, for example between internal and public data networks. When transmitting data via internet protocol networks (IP networks), problems repeatedly occur when an address translation takes place at a network boundary using Network Address Translation (NAT). NAT is of fundamental importance to internet technology for various reasons in this connection. Among other things, various types of access security in the form of a firewall as well as error tolerance and high availability are supported. Basic network administration functions are also simplified.

Since the address space provided in the founding years of the internet will in the foreseeable future no longer be sufficient for the allocation of IP addresses, with the expansion of internal and highly complex data networks in particular demanding more and more IP addresses, NAT is primarily used to outwardly conceal the internally used IP addresses, however. This makes administration of internal networks easier on the one hand and reduces costs on the other since fewer public IP addresses that are subject to a cost have to be outwardly used than are required internally. A large number of terminals may thus be mapped in an internal network onto a single public IP address by varying the port address of the public IP address.

With NAT, the IP header of an IP data packet is modified before the packet is sent. The internal IP address, including port number, is replaced by a public IP address with a different port number. A NAT host stores the assignment (mapping) of internal IP address to the public (external) IP address. If the NAT host accordingly receives an IP data packet, it maps the public (external) IP address to the internal IP address again. The NAT host is to be understood in this connection as meaning a computer that connects two networks together and on which corresponding software (NAT engine) handles the address translation.

SUMMARY OF INVENTION

The translation of private IP addresses into public IP addresses is very complex and overtaxes many communication protocols. In connection with Voice over IP (VoIP) there is the additional problem of the NAT host only changing the IP header of each VoIP data packet by converting the private IP address of an internal client into the corresponding public IP address but not the VoIP protocol data required for correct delivery, in particular the private IP address in the payload part of the VoIP data packet. This means that the VoIP data packets of the external client cannot be delivered to the destination client.

It has already been proposed to expand the software in the terminals (clients) so that the address translation can be carried out via the look-ahead mechanism by a NAT host while retaining existing NAT configurations (patent application EP 1421766 A1). The method presented therein requires a very complex adaptation of the client on the software side, however, which often overtaxes users in the home sector in particular.

The object of the present invention is to provide a method that allows the translation of private IP addresses into public IP addresses in a communications network in as user-friendly a manner as possible and without the need to adapt the client software.

A further object of the present invention is to provide a device for performing the inventive method.

This object is achieved with respect to the method and to the device of the independent claims.

Advantageous embodiments and developments are the subject matter of the dependent claims.

An advantage of the present invention lies in the fact that the VoIP software on the clients does not have to be adapted for use in communications networks which are separated from pubic communications networks by a NAT host. A server system, for example a proxy server or preferably a gatekeeper, connected between private and public networks, assumes the functionality of the address translation of private IP addresses into public IP addresses. NAT addresses are thereby centrally negotiated in advance by this proxy server or gatekeeper in a VoIP network and the private IP addresses which are contained in the VoIP protocol data of each VoIP data packet are translated into the corresponding public IP addresses. Negotiation takes place via appropriate protocols, through the use of which the proxy server contacts a NAT name server, preferably a STUN (Simple Traversal of UDP over NATs) server. Moving the address translation to the intermediately connected server system means that it is no longer necessary to implement a NAT negotiation protocol on the clients; the clients thus remain unchanged. Translation of the IP addresses in the header of each VoIP data packet continues to be carried out by an explicit NAT host.

A further advantage of the present invention lies in the fact that the use of VoIP applications is significantly simplified for users in communications networks which integrate public and private IP addresses and are therefore dependent on NAT. Previously, a complex and time-consuming configuration of the clients was necessary or specific software was required in order to be able to communicate by VoIP in NAT environments also, so until now VoIP products could only be configured by experienced users or technical personnel, while private users often found performing the configuration to be beyond their capabilities. Adapting the software is particularly complicated in what are known as "embedded systems" in which, in contrast to standalone systems such as PCs, new software can only be integrated with difficulty. The present invention represents a significant advantage in particular for "embedded systems" of this type.

BRIEF DESCRIPTION OF THE DRAWINGS

The invention will be described in more detail hereinafter with reference to an exemplary embodiment and with reference to the accompanying drawing, in which:

FIG. 1 shows address translation by NAT in a communications network.

DETAILED DESCRIPTION OF INVENTION

FIG. 1 shows the inventive translation of private IP addresses into public IP addresses in a communications network consisting of two terminals (clients) C1, C2, a server system S, a proxy server (preferably a gatekeeper) PS, a NAT address server (preferably a STUN server) NA, and a NAT host NH. The communications network is divided into a private zone A and a public zone B, for example the public internet. The NAT host NH is located at the interface between the two communications networks A and B. According to the invention the proxy server PS is actively involved in the address translation by NAT. The sequence of steps in a VoIP session between two clients C1 and C2 with respect to the inventive address translation is described by way of example below.

Client C1 with private IP address 141.23.209.105 starts a connection setup for a VoIP session with client C2 to which the IP address 192.178.63.4 is assigned. The connection request first of all reaches the proxy server PS in the form of a VoIP data packet via the private communications network A. The VoIP data packet comprises a header, which contains the IP address of the sender C1, and a payload part, which contains the VoIP protocol data. The VoIP protocol data contains both the IP address, including port details of the sender C1 (141.23.209.105:1245) and the IP address of the receiver of client C2 (192.178.63.4:1720). Since the payload part containing the VoIP protocol data remains untouched by the Nat host NH, the proxy server PS accordingly firstly translates the private IP address of the client C1 (141.23.209.105:1245) into the correct public IP address (145.30.62.1:48324). For this purpose the proxy server PS contacts a NAT address server NA and transmits the private IP address of the client C1, including port details (141.23.209.105:1245). The NAT address server NA then sends the corresponding public IP address, including port details, for the client C1 (145.30.62.1:48324) to the proxy server PS. The proxy server PS accordingly replaces the private IP address of client C1 (141.23.209.105:1245) in the VoIP protocol data with the correct public IP address (145.30.62.1:48324) and sends the VoIP data packet V2 onward to the NAT host NH. The NAT host NH accordingly replaces the private IP address of the sender C1 (141.23.209.105:1245) in the header of the VoIP data packet with the correct public IP address (145.30.62.1:48324) and sends the VoIP data packet V3 to the client C2. The client C2 can accordingly extract the correct public address (145.30.62.1:48324) of the requesting client C1 from the thus modified VoIP protocol data and in turn accordingly send an appropriate response in the form of a VoIP data packet V4 back to the client C1. The header of the VoIP data packet V4 contains the public IP address of the receiver C1 (145.30.62.1:48324). The public address of C1 (145.30.62.1:48324) is also entered in the VoIP protocol data of the VoIP data packet V4 as the receiver. The VoIP data packet V4 reaches the NAT host NH, which translates the public IP address of client C1 (145.30.62.1:48324) into the correct private IP address (141.23.209.105:1245) and sends the thus modified VoIP data packet V5 onward to client C1. Before the VoIP data packet V5 reaches client C1, the VoIP protocol data is adapted by the proxy server PS in that it determines by means of a request to the NAT address server NA and with the aid of the public IP address of client C1 (145.30.62.1:48324), the correct private IP address of client C1 (141.23.209.105:1245) and translates the receiver address in VoIP protocol data accordingly into the correct private IP address of client C1 (141.23.209.105:1245). The proxy server then sends the thus modified VoIP data packet onward to the client C1. A VoIP session is thus successfully initiated. A direct communications link can accordingly be established between clients C1 and C2 on the basis of suitable media protocols, for example RTP or RTCP. In media protocols such as RTP, IP addresses are transmitted solely in the header. The actual media protocol data does not contain IP addresses, so they do not have to be adapted either if during the subsequent course of the VoIP session media data is exchanged between clients C1 and C2 beyond NAT boundaries.

In addition to the scenario illustrated above, as shown in FIG. 1, it is also conceivable for client C2 to initiate a VoIP session. In this case it is merely necessary for client C1 to know its public IP address and to communicate this to client C2 in a suitable manner (for example by e-mail) to make it possible to establish a connection. The further course of establishing the VoIP session is analogous to the scenario described above.

An expanded scenario is also conceivable in which client C1 and client C2 are each located in a private communications network that is separated from other communications networks by a NAT host in each case. In this case it is necessary for each of the two proxy servers involved to know the public IP address of the respective other proxy server and to communicate this in a suitable manner to the respective external client before the actual VoIP session is set up.

The invention claimed is:

1. A method for translating internet protocol addresses inside a communications network having internet protocol data packets switched between communication devices and the communications network is divided into a public communications network and at least one private communications network, comprising:

first, by a proxy server located at the at least one private communications network and the public communications network:
receiving a first internet protocol data packet from a first terminal as a sender terminal, the first packet comprising a private internet protocol address of the first terminal in a payload section and in a header section of the first packet;
obtaining from a Network Address Translation (NAT) address server an associated public internet protocol address of the private internet protocol address of the first terminal;
updating the first packet by replacing the private internet protocol address of the first terminal in the payload section of the first packet with the associated public internet protocol address; and
transmitting the updated first packet toward a NAT host;
second, by the NAT host located between the at least one private communications network and the public communications network:
receiving the updated first packet from the proxy server;
translating the private internet protocol address of the first terminal in the header section of the updated first packet to the associated public internet protocol address;
further updating the updated first packet by replacing the private internet protocol address of the first terminal in the header of the updated first packet with the associated public internet protocol address; and transmitting the further updated first packet toward a second terminal external to the at least one private communications network via the public communications network;
third, by the NAT host located between the at least one private communications network and the public communications network:
receiving a second internet protocol data packet from the second terminal, the second packet comprising the public internet protocol address of the first terminal in a payload section and in a header section of the second packet;
translating the public internet protocol address of the first terminal in the header section of the second packet to the associated private internet protocol address;
updating the second packet by replacing the public internet protocol address of the first terminal in the header of the second packet with the associated private internet protocol address; and
transmitting the updated second packet toward the first terminal; and
fourth, by the proxy server located at the at least one private communications network and the public communications network:
receiving the updated second packet from the NAT host;
obtaining from the NAT address server an associated private internet protocol address of the public internet protocol address of the first terminal;
updating the updated second packet by replacing the public internet protocol address of the first terminal in the payload section of the updated second packet with the associated private internet protocol address; and
transmitting the updated second packet toward the first terminal.

2. The method as claimed in claim 1, wherein that the internet protocol data packets are Voice over IP data packets.

3. The method as claimed in claim 1, wherein that the NAT address server is configured as a Simple Traversal of UDP over NATs server.

* * * * *